Figure 4:
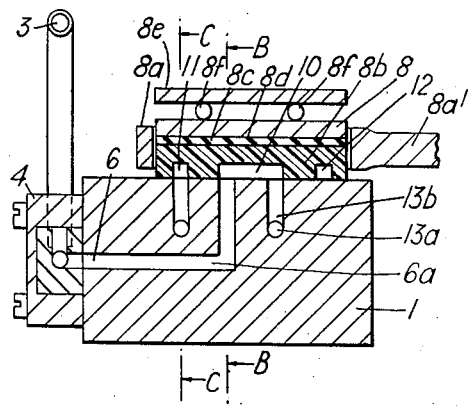

Aug. 5, 1958    H. R. RONNEBECK    2,846,121
APPARATUS FOR DISPENSING FLUIDS
Filed Sept. 6, 1956    2 Sheets-Sheet 1
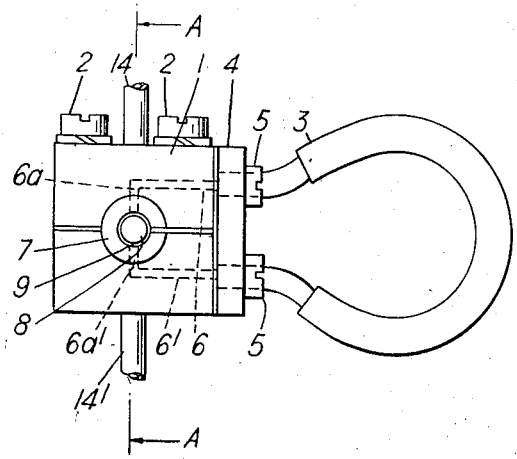
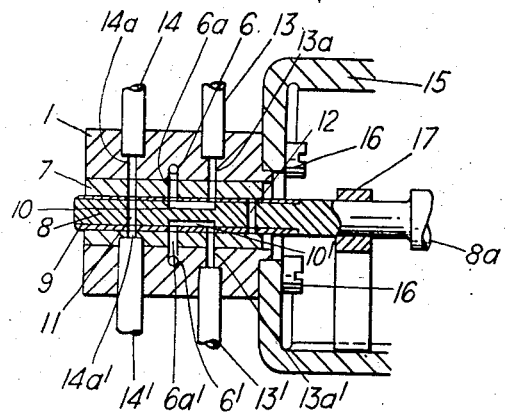
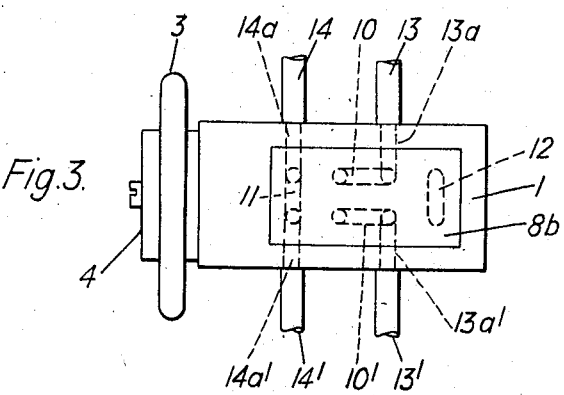
Inventor
Heinrich Richard Ronnebeck
By Cushman, Darby & Cushman
Attorneys Aug. 5, 1958  H. R. RONNEBECK  2,846,121
APPARATUS FOR DISPENSING FLUIDS
Filed Sept. 6, 1956  2 Sheets-Sheet 2

Inventor
Heinrich Richard Ronnebeck

By Cushman, Darby & Cushman
Attorneys

United States Patent Office 2,846,121
Patented Aug. 5, 1958

2,846,121

APPARATUS FOR DISPENSING FLUIDS

Heinrich Richard Ronnebeck, Norton-on-Tees, England, assignor to Imperial Chemical Industries Limited, London, England, a corporation of Great Britain Application September 6, 1956, Serial No. 608,354

Claims priority, application Great Britain September 7, 1955

12 Claims. (Cl. 222—133)

This invention relates to apparatus for delivering measured volumes of fluids and more particularly to apparatus for delivering accurate small volumes of gas or liquids at desired intervals.

In many operations it is desirable to be able to deliver constant small volumes of gas or liquid at desired intervals, for example in routine gas analysis and more particularly in the recently developed techniques of vapour phase chromatography.

According to the present invention there is provided apparatus for delivering at desired intervals a predetermined volume of a desired fluid into a stream of a second fluid, said apparatus comprising in combination a chamber for the volume of desired fluid and a valve comprising a body and slide, said valve body being provided with ports and passages communicating with the said chamber for the desired fluid and with a conduit for the second fluid and said valve slide being provided with recesses or passages which are arranged to co-operate with the ports in the valve body to form a continuous path for a stream of the desired fluid through the valve and the chamber and a continuous path for a stream of the second fluid through the valve and the conduit when the valve slide is at one end of its stroke and to disconnect the stream of the desired fluid from the chamber and to pass it directly through the valve and to deliver the volume of the desired fluid in the chamber into the stream of the second fluid when the valve slide is at the other end of its stroke, said valve slide being adapted to be moved from one end of its stroke to the other at the desired intervals by mechanical or other means.

It will be understood that the materials from which the apparatus is made will be chosen so that corrosion is not likely to occur. The materials may, for example, be metals or glass. As it is also desirable to avoid extraneous matter entering the fluids it is preferable for the valve body and slide to be made from materials of the kinds that, in addition to being corrosion resistant, obviate the necessity of supplying lubricating media to the working faces.

The chamber for the predetermined volume of the desired fluid may take any convenient form. It has, however, been found convenient, particularly when the apparatus is to be applied to chromatography, for the chamber to be of tubing which is bent into a horseshoe shape or a coil, the open ends of which are secured into recesses in a flange which is suitably drilled to provide paths for the fluid and is adapted to be connected to the valve body in such manner as to complete the path for the stream of desired fluid through the valve and the chamber when the valve slide is at one end of its stroke. It will be understood that the bore and length of the tubing will be chosen to give the required volume of the desired fluid, and that, on the valve slide being moved to the other end of its stroke, the said volume of the desired fluid will be delivered substantially as a "slug" into the stream of the second fluid.

When however only very small volumes, for example of the order of one cubic centimetre or less, of the desired fluid are required to be delivered the chamber may be arranged as a cavity or channels within the valve slide.

The valve may be of the type comprising a piston or ram sliding in a cylinder which is integral with the valve body, the piston or ram being provided with recesses or passages suitably arranged to co-operate with ports in the cylinder wall to give the desired flows of the fluids when the piston or ram is at the ends of its stroke.

In a preferred form of valve comprising a ram sliding in a cylinder, the cylinder is provided with a bush of flexible thermoplastic material, which is preferably the polytetrafluorethylene sold under the British registered trademark "Fluon," and which is provided with passages or ports to give the desired flows of the fluids through the valve.

In addition when the ram is of metal it may be provided with a sleeve which is superfinished externally to ensure intimate contact between the working surfaces, the sleeve being suitably provided with ports to register with recesses or passages which are arranged in the core rod of the ram. The sleeve will be firmly attached at its ends to the core rod of the ram, for example by soldering.

The valve however may be one with a flat working face between the body and the slide, the latter being external to the valve body and provided, in its working face, with suitable stopped grooves to co-operate with ports in the face of the valve body to give the desired flows of the fluids when the slide is at the ends of its stroke.

In order to maintain close contact of the working faces of the valve body and the external slide it is desirable to apply external pressure to the latter. This may be done by providing an upper bearing plate in contact with the slide and upon which pressure is applied by a suitable spring which is compressed between said bearing plate and a cover enclosing the slide.

In such an arrangement it is desirable to minimise the friction between the bearing plate and the slide, for example by inserting a suitable rolling element between these parts. Such an element may conveniently take the form of a bearing comprising three or more balls in a cage since the provision of lubrication between the said parts will not then be necessary.

In a preferred form of valve with an external slide the body of the valve is of metal or glass and the valve slide is arranged as a metal frame into which flexible thermoplastic material, preferably the polytetrafluorethylene sold under the British registered trademark "Fluon," is fitted to form the working face of the slide, the thermoplastic being, of course, suitably grooved in its face to co-operate in the desired manner with ports in the valve body. The thermoplastic material is preferably backed by a pad of resilient material, for example india rubber, sponge rubber, perforated rubber sheet or cork, and a lower bearer plate and is pressed into contact with the valve body over the whole of its face by means of a spring exerting pressure, through an upper bearer plate and roller element as hereinbefore described, on said lower bearer plate.

The movement of the valve slide at the desired intervals may be effected in any suitable manner. For example the valve slide may be connected in known manner to a crank which is driven at the requisite speed by any convenient means or the valve slide may be connected to and operated by electrical means, such as a solenoid which is controlled by a suitable timing switch. It is preferred however to arrange the valve slide integral with a piston working in a cylinder to which fluid pressure, for example compressed air, is admitted and released at the desired intervals by means of a valve which is controlled by clockwork or by electric motor and reduction gear. It is convenient to arrange said piston and cylinder to be of a length greater than is necessary to give the required stroke of the valve slide and to make the extended portions of the piston and cylinder of smaller diameter so that a constant fluid pressure may be applied to the annular surface at the back of that portion of the piston having the larger diameter to provide pressure for the return stroke.

Two forms of the apparatus of the present invention will now be described by reference to Figures 1 to 6 of the accompanying drawings.

In the drawings Figures 1 and 2 illustrate one form of the apparatus which comprises a valve of the type having a ram sliding in a cylinder which is integral with the valve body, the Figure 1 being an end elevation and Figure 2 being a section on line A—A of Fig. 1.

Figure 5:
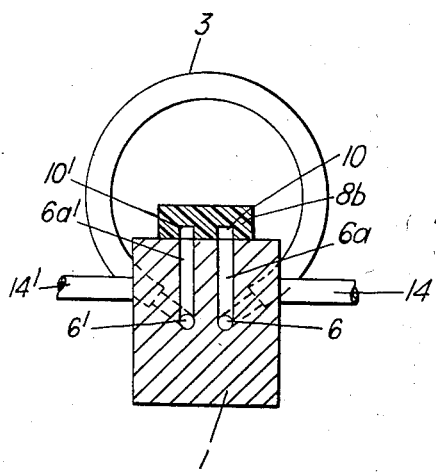
Figure 6:
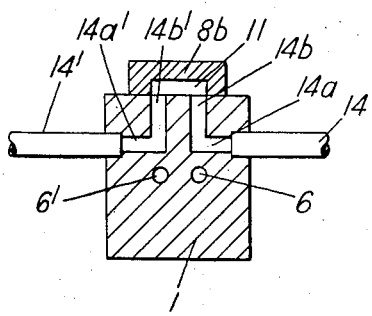

The Figures 3 to 6 illustrate a form of the apparatus which comprises a valve of the type having an external slide with a flat working face, the Figure 3 being a plan view, Figure 4 a longitudinal section, Figure 5 a cross section on line B—B of Figure 4 and Figure 6 a cross-section on line C—C of Figure 4.

Referring to Figures 1 and 2 of the drawings in which the same numerals denote the same parts, the numeral 1 denotes the valve body which is in two parts held together by (four) screws 2, which for clarity are not shown in Figure 2. The chamber for the predetermined volume of desired fluid comprises the horse-shoe shaped tube 3 the ends of which are secured into recesses in the flange 4 which is in turn secured to the valve body 1 by (four) screws 5 so that the ends of the tube 3 register with the passages 6 and 6' arranged in the valve body.

Inserted in the valve body 1 is the bush 7 of the thermoplastic material the valve body 1 and the bush 7 being provided with passages 6a and 6a' to form continuations of the passages 6 and 6' respectively. The numeral 8 denotes a ram which is adapted to slide in the bush 7 within the valve body 1 and is provided with a superfinished sleeve 9 to ensure intimate contact with the internal surface of the bush 7. Two horizontal passages 10 and 10' and two vertical passages 11 and 12 respectively are arranged in the ram 8 which at its end 8a (shown broken in Figure 2) is connected with means (not shown) for moving it through the desired stroke at the desired intervals. The valve body 1 is also provided with inlet and outlet connections 13 and 13' respectively and passages 13a and 13a' for the desired fluid and inlet and outlet connections 14 and 14' and passages 14a and 14a' for the second fluid.

The numeral 15 denotes a housing or bracket to which the valve body is attached by screws 16. The numeral 17 denotes a guide for the ram 8. The housing or bracket 15 may conveniently be a part of the unit (not shown) comprising the means for moving the ram 8 at the desired intervals.

In Figure 2 the ram 8 is shown at the end of its stroke in which position the desired fluid enters to valve by the inlet connection 13, passes through the passages 13a, 10 (in the ram), 6a and 6 into and through the chamber 3 and leaves the valve through the passages 6', 6a', 10', 13a' and the outlet 13' while the second fluid enters by the inlet connection 14 and passes through the valve by the passages 14a, 11 (in the ram), 14a' and the outlet 14'.

When the ram is moved to the other end of its stroke the passage 12 in the ram registers with the passages 13a and 13a' in the valve body 1, thereby isolating the desired fluid from the chamber 3 and allowing it to pass straight through the valve, while passages 10 and 10' in the ram register with the passages 14a and 14a' thereby connecting the chamber 3 so that the volume of desired fluid in it is passed into the stream of the second fluid.

Referring now to Figures 3, 4, 5 and 6 of the drawings, the parts of the valve corresponding to those of Figures 1 and 2 are denoted by the same numerals so that their significance is thereby made clear without further description.

The numeral 8 however denotes an external slide which comprises a metal frame 8a—which for clarity is not shown in Figures 3, 4 and 5—into which is fitted a block 8b of thermoplastic material having in its underside stopped grooves 10, 10', 11 and 12 arranged to co-operate with the passages in the valve body 1. The thermoplastic material 8b is backed by a pad 8c of india rubber with a lower bearer plate 8d and an upper (fixed) bearer plate 8e between which rolling element 8f is arranged. The (fixed) upper bearer plate 8e is attached to an element (not shown) which covers the valve and pressure is applied to 8e by a spring which is fitted between it and said element.

The end 8a' of the frame of the slide is connected with means (not shown) for moving it through the desired stroke at the desired intervals.

In Figures 3 and 4 the slide 8 is shown at the end of its stroke in which position the desired fluid enters the valve by the inlet connection 13, passes through the passages 13a, 13b, 10 (in the slide), 6a and 6 into and through the chamber 3 and leaves the valve through the passages 6', 6a', 10', 13b', 13a' and the outlet 13', while the second fluid enters by the inlet 14 and passes through the valve by the passages 14a, 14b, 11 (in the slide), 14b', 14a' and the outlet 14'.

When the slide is moved to the other end of its stroke the passage 12 in the slide registers with the passages 13b and 13b' in the valve body 1, thereby isolating the desired fluid from the chamber 3 and allowing it to pass straight through the valve, while grooves 10 and 10' in the slide register with the passages 14b and 14b' thereby connecting the chamber 3 so that the volume of desired fluid in it is passed into the stream of the second fluid.

I claim:

1. Apparatus for delivering at desired intervals a predetermined volume from a continuous stream of a desired fluid into a continuous stream of a second fluid with only momentary interruption of the flows of the streams, said apparatus comprising in combination a chamber for the volume of desired fluid and a valve comprising a body and slide, said valve body being provided with ports and passages communicating with the said chamber for the desired fluid and with a conduit for the second fluid and said valve slide being provided with passages which are arranged to co-operate with the ports in the valve body to form a continuous path for a stream of the desired fluid through the valve and the chamber and a continuous path for a stream of the second fluid through the valve and the conduit when the valve slide is at one end of its stroke and to disconnect the stream of the desired fluid from the chamber and to pass it directly through the valve and to deliver the volume of the desired fluid in the chamber into the stream of the second fluid when the valve slide is at the other end of its stroke, said valve being adapted to be moved from one end of its stroke to the other at the desired intervals.

2. Apparatus as claimed in claim 1 in which the valve is of the type comprising a piston sliding in a cylinder.

3. Apparatus as claimed in claim 2 in which the cylinder is bushed with flexible thermoplastic material.

4. Apparatus as claimed in claim 2 in which the piston is provided with a superfinished sleeve.

5. Apparatus as claimed in claim 1 in which the valve is one with a flat working face between the body and the slide, said slide being external to the valve body.

6. Apparatus as claimed in claim 5 in which external pressure is applied to the slide to maintain close contact of the working faces.

7. Apparatus as claimed in claim 6 in which the external pressure is applied by a suitably disposed spring.

8. Apparatus as claimed in claim 5 in which the valve slide comprises a metal frame into which flexible thermoplastic material is fitted.

9. Apparatus as claimed in claim 3 in which the thermoplastic material is polytetrafluorethylene.

10. Apparatus as claimed in claim 1 in which the valve slide is arranged integral with a piston working in a cylinder to which fluid pressure is admitted and released at the desired intervals.

11. Apparatus as claimed in claim 10 in which the fluid is compressed air.

12. Apparatus as claimed in claim 10 in which the fluid is admitted and released at the desired intervals by means of a valve which is controlled by clockwork or by electric motor and reduction gear.

References Cited in the file of this patent

UNITED STATES PATENTS

| | | |
|---|---|---|
| 2,453,553 | Lansley | Nov. 9, 1948 |
| 2,744,789 | Sutton | May 8, 1956 |

FOREIGN PATENTS

| | | |
|---|---|---|
| 725,847 | Great Britain | Mar. 9, 1955 |